United States Patent [19]
Gunderson

[11] 3,876,259
[45] Apr. 8, 1975

[54] PNEUMATIC BOOSTER VALVES FOR TRANSPORTING HOT ABRASIVE MATERIAL

[75] Inventor: George A. Gunderson, North St. Paul, Minn.

[73] Assignee: Dynamic Air, Inc., St. Paul, Minn.

[22] Filed: Feb. 1, 1974

[21] Appl. No.: 438,784

[52] U.S. Cl. ............................................... 302/24
[51] Int. Cl. ........................................... B65g 53/18
[58] Field of Search .............................. 302/24, 25

[56] References Cited
UNITED STATES PATENTS

| | | | |
|---|---|---|---|
| 1,233,991 | 7/1917 | Jardins | 302/25 X |
| 2,597,916 | 5/1952 | Anderson | 302/25 X |
| 3,604,758 | 9/1971 | Flain et al. | 302/24 |

Primary Examiner—Evon C. Blunk
Assistant Examiner—W. Scott Carson
Attorney, Agent, or Firm—Jacobson and Johnson

[57] ABSTRACT

A pneumatic conveyor booster valve for transporting hot abrasive materials is constructed with a diverging section and converging section and an air inlet located radially between the converging and diverging sections of the booster valve. Pressurized gas is introduced to the pneumatic conveyor tube through an annular diffuser member comprised of a plurality of mesh screens diffusion bonded to form a single air diffusing inlet.

5 Claims, 2 Drawing Figures

PRESSURIZED AIR

PNEUMATIC BOOSTER VALVES FOR TRANSPORTING HOT ABRASIVE MATERIAL

BACKGROUND OF THE INVENTION

1. Field of the Invention

Pneumatic conveyors and booster valves are often employed for the transfer of various material and are well known in the art. One such example is shown in U.S. Pat. No. 3,708,207, titled "High Pressure Booster Valve" which is assigned to the same assignee as the present invention. This invention relates generally to booster valves and more specifically, to booster valves which are used for transporting high temperature abrasive materials. Examples of such abrasive materials are foundry shake out sand or hot beryllium oxide. Because those materials are abrasive and are required to be transported at temperatures of 500°–600°F., they quickly destroy the conventional booster valves. The present invention comprises a booster valve suitable for boosting the pressure on the pneumatic conveyor tube handling such hot abrasive materials.

One of the particular problems with transporting abrasive materials is to supply air from a booster valve without having the hot abrasive material back up into the pressure line if the pressure in the pneumatic line should accidentally exceed the booster valve back pressure. Another problem is the surges in the line pressure often occur if one directs additional air axially along the pneumatic conveyor tube. The present invention provides a solution to these problems.

SUMMARY OF THE INVENTION

Briefly, the invention comprises a booster valve for transporting hot abrasive materials without clogging. The booster valve includes an air inlet diffuser section located between a converging and diverging section of the pneumatic conveyor tube. An annular set of screens which have been diffusion bonded together are positioned radially to uniformly distribute air to the conveyor tube and prevent back flow. A plenum chamber is spaced radially from the diffusion bonded screens to provide a uniform pressure source.

DESCRIPTION OF THE PREFERRED EMBODIMENT

Figure 1:
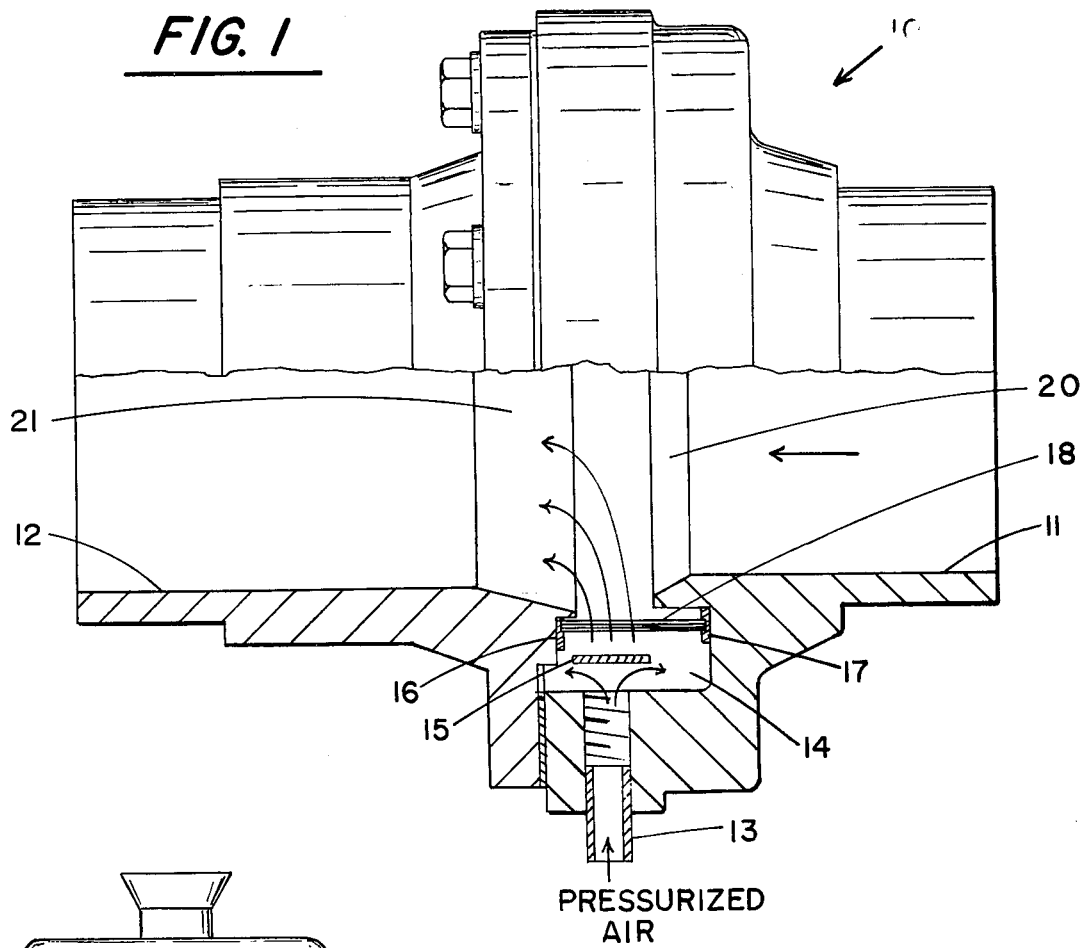
FIG. 1 is a sectional view of the booster valve of the present invention.

Referring to FIG. 1, reference numeral 10 generally designates a booster valve comprising a first pneumatic conveyor section 11 which is in line with a second pneumatic conveyor section 12. The interior of pneumatic conveyor section 11 has a conical tapered section 20 which diverges toward a radial air inlet diffuser 18. Similarly, the pneumatic conveyor section 12 has a conically converging section which converges from the radial air inlet diffuser 18 to conveyor section 12. Located between conical tapered sections 20 and 21 is annular air inlet diffuser 18 which is comprised of laminated wire mesh members which are seated and sealed on one edge by a gasket 16 and on the opposite edge by a gasket 17. An air inlet passage 13 supplies pressurized air to an annular plenum chamber 14 which is radially spaced from annular inlet diffuser member 18 and extends around the circumference of booster valve 10. A baffle 15 is located immediately in front of air inlet passage 13 to divert the flow of air into plenum chamber 14. The air inlet diffuser section 18 is comprised of a plurality of laminated wire mesh screens 18 which are diffusion bonded together to produce a rigid self supporting structure. It has been found that the laminated screens provide an extremely low resistance to air flow while providing filtering capacity as low as 1 micron. The filtering feature is extremely important to the operation of an entire system when the materials being conveyed are hot abrasive materials as the hot abrasive particles could quickly ruin the mechanical parts of any air source system.

Figure 2:
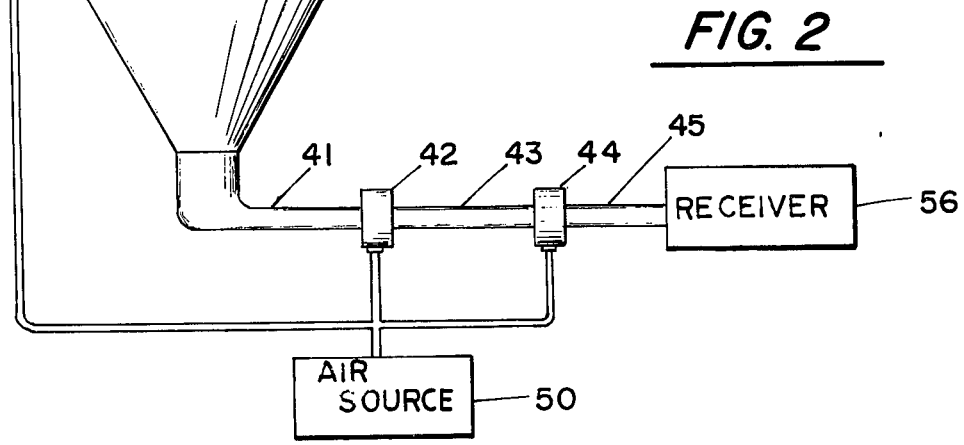
FIG. 2 is a diagrammatic view of a typical pressurized pneumatic conveyor system in which the present invention can be utilized.

Referring to FIG. 2, a typical pneumatic conveyor system is shown in schematic form. The hot abrasive material to be transported is introduced into a pressurized transporter 40. Typically, the material transported with the present invention is hot abrasive materials such as foundry shake out sand or beryllium oxide or any type of granular material which must be transported at an elevated temperature. The material from the transporter 40 is fed through a conveyor tube 41, a booster valve 42, a conveyor tube 43, a booster valve 44, a conveyor tube 45 and eventually into receiver 56. A source of pressurized air 50 supplies pressurized air to booster valves 42 and 44. Typically, air source 50 contains pressure regulators as well as flow regulators to allow an operator to either manually or automatically adjust the flow rates to the booster valves 42 and 44. It is these units which must be protected against any harmful back flow of hot abrasive particles.

In operation of booster valve 10, the hot abrasive or granular material flows from section 11 to section 12. The hot abrasive material transported in booster valve 10 may have temperatures on the order of 500° to 600° F. consequently the conveying tube must be formed of hardened material which can withstand these conditions. The purpose of spacing the air inlet screen away from conveyor tube sections 11 and 12 is to prevent continuous contact of the hot abrasive materials on diffuser screen 18 which would rapidly errode away screen 18. Generally, the spacing of any type of air inlet device or air supply device away from the main path of the conveying tube has produced clogging problems, i.e., the particles tend to slow down and accumulate in any expanded region. However, with the present invention it has been discovered that the spacing of the air inlet member between conical tapered members 20 and 21 and providing an even radial distribution of air to the conveyor tube does not produce clogging. That is, with a continuous flow of air through annular diffuser member 18, one apparently produces a pinching effect on the main air stream which prevents the material from backing up or clogging up in expanded region by inlet diffuser member 18.

The preferred material used for the annular mesh screens is stainless steel which has a capability of withstanding intermittent temperatures of up to 1200° F. The air flow rate may range from as slow as .1SCFM/ft$^2$ to 50 SCFM/ft$^2$ with the inlet pressure as low as 2 psi greater than the static pressure in the conveying tube. The sizes and pore openings of the mesh screen can vary within wide ranges but it is generally preferred that the pore size is on the order of 10 microns or less so that when the mesh screens are laminated together by diffusion bonding the composite screen will be self supporting and have openings no larger than 1 micron in size. The pore opening can be controlled by using more or less layers of wire mesh, however, to obtain the effectiveness of an inlet diffuser with capacity for screening out small particles, it is necessary to laminate together a plurality of mesh screens. Preferably, at least four screens are required.

I claim:

1. A booster valve for use in pneumatic conveying apparatus for transporting hot abrasive materials comprising:

an annular air diffuser member for directing air into said booster valve;

a first pneumatic conveying tube having a diverging section which diverges to said annular air diffuser member;

a second pneumatic conveying tube having a converging section for converging from said annular air diffused member to said second pneumatic conveying tube, said converging section spaced from and in substantial alignment with said diverging section;

said annular air diffuser member spaced from said converging section and said diverging section for directing air radially inward to a position between said converging section and said diverging section to boost the pressure in the pneumatic conveying apparatus, said annular air diffuser member comprising a plurality of wire mesh screens bonded to one another to thereby produce an annular air diffuser member having a low pressure loss and a high back filtering capacity; and means defining a plenum chamber, said plenum chamber located in fluid communication with said annular air diffuser member.

2. The invention of claim 1 wherein said annular air diffuser member comprises at least four wire mesh screens diffusion bonded together.

3. The invention of claim 2 wherein the maximum opening in said annular air diffuser member is less than one micron.

4. The invention of claim 3 wherein said annular air diffuser member comprises stainless steel.

5. The invention of claim 4 wherein said air annular air diffuser member is positioned substantially parallel to the said conveying tube.

* * * * *